W. L. BEARD.
PEANUT HARVESTER.
APPLICATION FILED OCT. 13, 1916.

1,313,053.

Patented Aug. 12, 1919.
2 SHEETS—SHEET 1.

Inventor
W. L. Beard
By Victor J. Evans
Attorney

Witnesses

W. L. BEARD.
PEANUT HARVESTER.
APPLICATION FILED OCT. 13, 1916.
1,313,053.
Patented Aug. 12, 1919.
2 SHEETS—SHEET 2.
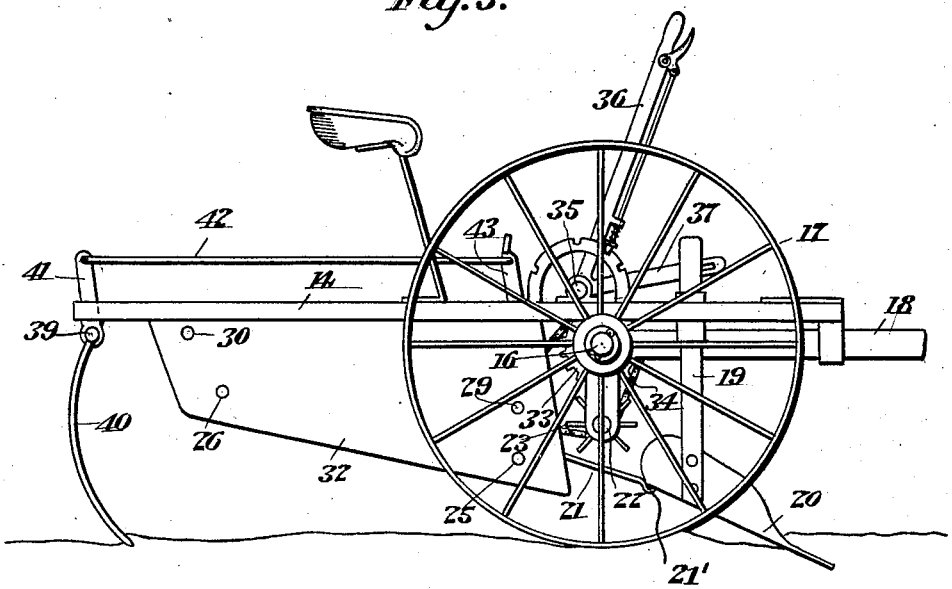
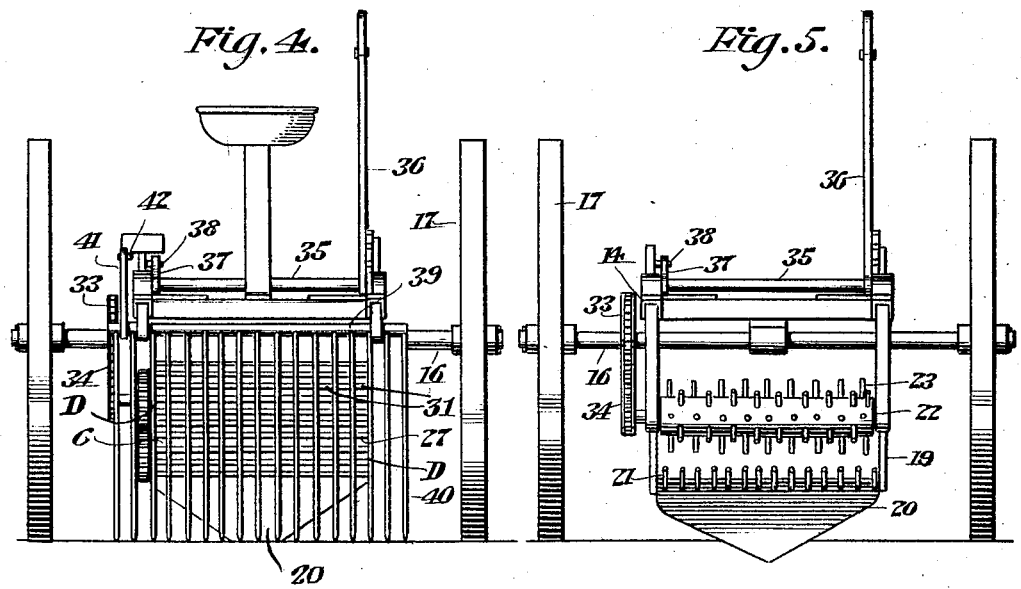

UNITED STATES PATENT OFFICE.

WILLIE LEE BEARD, OF COMANCHE, TEXAS.

PEANUT-HARVESTER.

1,313,053.  Specification of Letters Patent.  Patented Aug. 12, 1919.

Application filed October 13, 1916. Serial No. 125,483.

*To all whom it may concern:*

Be it known that I, WILLIE L. BEARD, a citizen of the United States, residing at Comanche, in the county of Comanche and State of Texas, have invented new and useful Improvements in Peanut-Harvesters, of which the following is a specification.

This invention relates to peanut harvesters, and it has for its object to produce a simple, effective and improved organized machine whereby the peanuts and vines will be raised from the ground, agitated to remove the dirt therefrom, deposited on the surface of the ground, and bunched or gathered into piles of convenient size for subsequent gathering and removal.

A further object of the invention is to simplify and improve the construction and operation of the detailed parts of the device.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modification within the scope of the claim may be resorted to when desired.

In the drawings,—

Fig. 3 is a side elevation.

Fig. 4 is a rear elevation.

Fig. 5 is a transverse sectional view taken on the line 5—5 in Fig. 1 through the plow and its adjusting means.

Corresponding parts in the several figures are denoted by like characters of reference.

Figure 1:
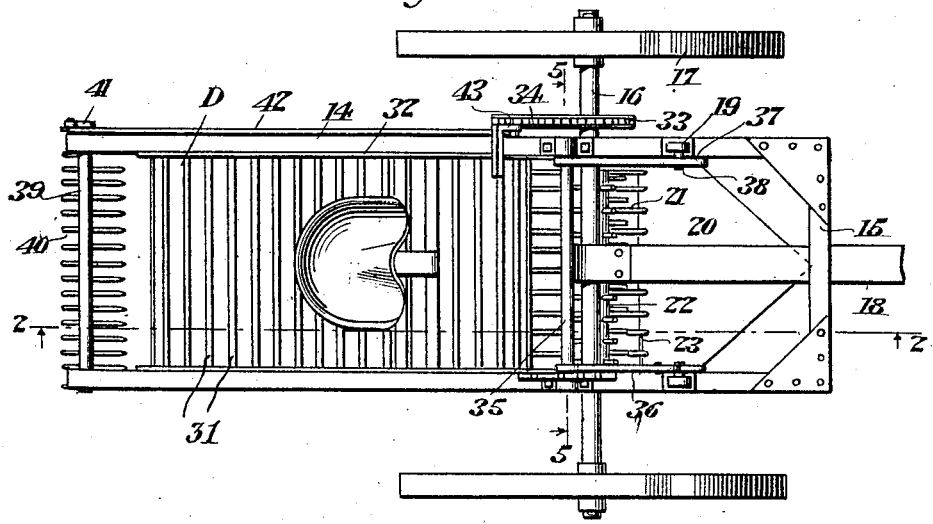
Figure 1 is a top plan view of a machine constructed in accordance with the invention.
Figure 2:
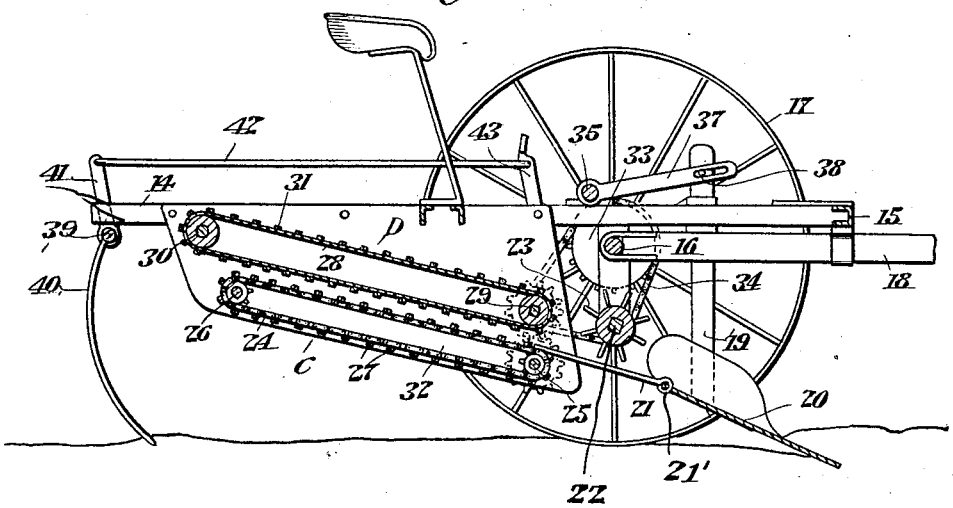
Fig. 2 is a longitudinal sectional view taken on the line 2—2 in Fig. 1.

The frame of the improved machine is composed of side members 14 and a front cross bar 15, said frame being supported on an axle 16 having ground wheels 17. A tongue 18 extends from the axle forwardly beneath the front bar of the frame which is connected therewith and supported thereby, said tongue being utilized for the attachment of the draft in the customary manner.

Guided for vertical movement with respect to the side members 14 of the frame are standards 19 carrying at their lower ends the plow or ground engaging blade 20 which is adapted to dig beneath the surface of the soil so as to lift the roots and vines which, as the machine advances, ride over the inclined plane which constitutes the surface of the plow and over the fingers 21 that extend rearwardly from the same. Each of the fingers 21 are provided at its forward ends with an eye 21' whereby it is hingedly connected with the rearward edge of the digger 20. A beater shaft 22 which is supported for rotation to the rearward of the plow is provided with radially extending teeth or beaters 23 which serve to agitate the roots and vines as they pass over the fingers 21, thereby removing the adhering dirt which is permitted to sift between the fingers and also assisting the passage of the roots and vines in a rearward direction.

It will be noted that the beater is arranged intermediate the shovel and conveyer and that in action said beater in operation upon material will press the fingers 21 onto the elevator so that the material passing over said fingers or forced thereover by the beater will be directed to the elevator with safety.

From the fingers 21 the material is deposited on an elevator C which is composed of belts or chains 24 guided over shafts 25, 26, and connected by slats 27 which are properly spaced apart. The rearward ends of the fingers 21 being gravitationally supported on the elevator C it follows that the elevator will be properly engaged by said fingers at various adjustments of the digger with which the fingers are hingedly connected. A top conveyer D is also provided, the same consisting of an apron 28 guided over shafts 29, 30 and having tranverse slats 31. The elevator C and top conveyer D are guided between shields or side guards 32 to prevent material from dropping off at the sides of the machine. One of the wheels 17 is provided with a sprocket wheel 33 from which motion is transmitted by means of a chain 34 to the beater shaft and to the shafts 25, 29 at the lower front ends of the elevator and the conveyer, the transmission being as a matter of course so arranged that the parts will be driven in the proper directions.

Means are provided whereby the standards 19 carrying the plow 20 may be vertically adjusted, said means including a rock shaft 35 having a hand lever 36 and provided with radial arms 37 which are connected with the standards by means of links 38, thereby enabling standards carrying the plow to be raised or lowered to the desired point. Means may also be provided for retaining the parts in adjusted position.

Supported for rocking movement at the rearward part of the frame is a buncher consisting of a rocking head or shaft 39 having downwardly extending forwardly curved teeth 40 and a radially extending arm 41, which latter is connected by a rod 42 with an operating lever 43 which may be locked in position at various adjustments. By means of this buncher the material as it passes over the elevator on the ground may be raked together or "bunched," the buncher being manipulated by the lever 43 at suitable intervals when bunches or piles of the desired dimensions have been formed so as to discharge the same.

As will be seen from the foregoing description, taken in connection with the drawings hereto annexed, a simple and thoroughly efficient machine has been provided whereby peanuts may be harvested in a more rapid and inexpensive manner than as heretofore been practised.

Having thus described the invention, what is claimed as new, is:—

In a machine of the class described, a frame, an axle having ground wheels supporting the frame, standards supported for sliding movement with relation to the frame, and at right angles to the latter, a digger carried by the standards, an elevator supported by the frame in rear of the digger, a rotary beater supported directly by the axle and driven therefrom, said beater being arranged midway between the digger and elevator, and a series of longitudinally extending fingers movably connected at their forward ends to the rear end of the digger and overlying and resting upon the elevator at their rear free ends, said fingers underlying the beater and having their forward ends adjusted in the movement of the digger without affecting the relation of their rear ends with respect to the elevator and but slightly affecting their intermediate portions with respect to the beater.

In testimony whereof I affix my signature.

WILLIE LEE BEARD.

Copies of this patent may be obtained for five cents each, by addressing the "Commissioner of Patents, Washington, D. C."